(12) United States Patent
Dong et al.

(10) Patent No.: US 10,218,184 B2
(45) Date of Patent: Feb. 26, 2019

(54) METHOD FOR INHIBITING MULTIPLE INVERTER STATIONS FROM ENTERING PASSIVE CONTROL MODE IN ISLAND STATE

(71) Applicants: NR ELECTRIC CO., LTD., Nanjing, Jiangsu (CN); NR ENGINEERING CO., LTD., Nanjing, Jiangsu (CN)

(72) Inventors: Yunlong Dong, Jiangsu (CN); Jie Tian, Jiangsu (CN); Dongming Cao, Jiangsu (CN); Haiying Li, Jiangsu (CN); Jiudong Ding, Jiangsu (CN); Zhaoqing Hu, Jiangsu (CN); Gang Li, Jiangsu (CN); Haibin Liu, Jiangsu (CN); Yu Lu, Jiangsu (CN)

(73) Assignees: NR ELECTRIC CO., LTD., Nanjing, Jiangsu (CN); NR ENGINEERING CO., LTD., Nanjing, Jiangsu (CN)

( * ) Notice: Subject to any disclaimer, the term of this patent is extended or adjusted under 35 U.S.C. 154(b) by 128 days.

(21) Appl. No.: 15/533,560

(22) PCT Filed: Nov. 24, 2015

(86) PCT No.: PCT/CN2015/095373
§ 371 (c)(1),
(2) Date: Jun. 6, 2017

(87) PCT Pub. No.: WO2016/091060
PCT Pub. Date: Jun. 16, 2016

(65) Prior Publication Data
US 2017/0331297 A1    Nov. 16, 2017

(30) Foreign Application Priority Data

Dec. 11, 2014    (CN) .......................... 2014 1 0763582

(51) Int. Cl.
*H02J 3/46*          (2006.01)
*H02J 3/00*          (2006.01)
(Continued)

(52) U.S. Cl.
CPC .................. *H02J 3/46* (2013.01); *H02J 1/10* (2013.01); *H02J 3/00* (2013.01); *H02J 3/005* (2013.01);
(Continued)

(58) Field of Classification Search
CPC ........ H02J 3/46; H02J 3/38; H02J 3/36; H02J 3/005; H02J 2003/001; H02J 2003/388
See application file for complete search history.

(56) References Cited

U.S. PATENT DOCUMENTS

2011/0187197 A1* 8/2011 Moth ...................... H02J 9/062
                                                               307/66
2014/0368047 A1* 12/2014 Li ............................. H02J 1/00
                                                               307/82
2016/0118846 A1*  4/2016 Huang ...................... H02J 7/35
                                                              320/101

FOREIGN PATENT DOCUMENTS

| CN | 103269083 | 8/2013 |
| CN | 103414182 | 11/2013 |
| JP | 2011114899 | 6/2001 |

OTHER PUBLICATIONS

International Search Report filed in PCT/CN2015/095373 dated Mar. 3, 2016.

* cited by examiner

*Primary Examiner* — Daniel Kessie
(74) *Attorney, Agent, or Firm* — Rankin, Hill & Clark LLP

(57) ABSTRACT

The present invention provides a method for inhibiting multiple inverter stations from entering a passive control mode in an island state. The method includes dividing (Continued)

inverter stations into groups in advance; a principle for group division is dividing inverter stations whose alternating-current sides are connected to each other through an alternating-current line in a normal running condition into a group; priorities of the inverter stations are preset in each group to tune relevant fixed values of the inverter stations for island detection; a tuning principle is that an inverter station with a higher priority has a more sensitive relevant fixed value, and an island state is more easily detected for the corresponding inverter station; an inverter station for which an island state is detected can enter a passive control mode only when all the other inverter stations with priorities higher than the priority of the inverter station in the group send enabling signals.

4 Claims, 1 Drawing Sheet

(51) Int. Cl.
*H02J 3/36* (2006.01)
*H02J 3/38* (2006.01)
*H02J 1/10* (2006.01)

(52) U.S. Cl.
CPC ............... *H02J 3/36* (2013.01); *H02J 3/38* (2013.01); *H02J 2003/001* (2013.01); *H02J 2003/388* (2013.01)

METHOD FOR INHIBITING MULTIPLE INVERTER STATIONS FROM ENTERING PASSIVE CONTROL MODE IN ISLAND STATE

TECHNICAL FIELD

The present invention relates to the field of flexible direct-current transmission, and in particular, to a method for inhibiting multiple inverter stations from entering a passive control mode in an island state.

BACKGROUND

With continuous development of power electronic technologies, as a new-generation direct-current transmission technology, the flexible direct-current transmission technology may resolve many problems existing in current alternating and direct-current transmission technologies. A flexible direct-current transmission system may, together with an alternating-current system, supply power to a user load, so as to improve a power supply capability and power supply reliability. In a normal case, the user load is carried together by the alternating-current transmission system and the flexible direct-current transmission system, and the flexible direct-current transmission system is in an active control mode. When an alternating-current line stops running because of a fault, an island is formed. If there is only one inverter station in the island, the inverter station is in a passive control mode, can independently supply power to a user, and does not depend on the alternating-current system. If there are multiple inverter stations in the island, one of the inverter stations may be selected to enter the passive control mode to establish an alternating-current voltage for the island, and other inverter stations are still in an active control mode. If a fault occurs on the alternating-current line in the island again, multiple islands are formed. Therefore, one inverter station in the newly formed islands enters the passive control mode to establish an alternating-current voltage for the newly formed islands.

Therefore, when an island is formed, an appropriate island detection method is necessarily used to quickly and exactly detect an island state and switch one of the flexible direct-current inverter stations from an active control mode to a passive control mode while preventing other inverter stations from entering the passive control mode. If a fault occurs on the alternating-current transmission line in the island again, multiple islands are formed. Therefore, it needs to be ensured that one flexible direct-current inverter station in the newly formed islands can enter a passive control mode to establish an alternating-current voltage for the newly formed islands and continue supplying power to a user load.

In currently disclosed documents, there is no method for preventing multiple flexible direct-current inverter stations in an island from synchronously entering a passive control mode.

SUMMARY

An objective of the present invention is to provide a method for inhibiting multiple inverter stations from entering a passive control mode in an island state, so that multiple inverter stations in a same island may be prevented from being synchronously in a passive control mode, thereby preventing a converter valve from overcurrent damage caused by that the multiple inverter stations do not synchronously output voltages.

To achieve the foregoing objective, in the present invention, the following technical solution is used:

A method for inhibiting multiple inverter stations from entering a passive control mode in an island state includes grouping inverter stations into groups in advance and setting a priority of each inverter station for island detection in advance in each group to set a relevant fixed value of each inverter station for island detection. A principle for grouping the inverter stations into groups is grouping inverter stations whose alternating-current sides are connected to each other through an alternating-current line in a normal running condition into one group. A principle for setting the relevant fixed value of the inverter station for island detection is that an inverter station with a higher priority has a more sensitive relevant fixed value, and correspondingly, the inverter station detects an island state more easily.

An inverter station that detects an island state can enter a passive control mode only when all other inverter stations with priorities higher than the priority of the present inverter station in the present group send enabling signals. That all other inverter stations with priorities higher than the priority of the present inverter station in the present group send enabling signals includes the following cases:

(1) there is no inter-station communication between the present inverter station and the other inverter stations with priorities higher than the priority of the present inverter station in the present group;

(2) there is inter-station communication between the present inverter station and the other inverter stations with priorities higher than the priority of the present inverter station in the present group, and the other inverter stations with priorities higher than the priority of the present inverter station in the present group are not in the passive control mode; and (3) there is inter-station communication between the present inverter station and the other inverter stations with priorities higher than the priority of the present inverter station in the present group, and the other inverter stations with priorities higher than the priority of the present inverter station in the present group enter the passive control mode and delay for a time of t, where 0<t<10 seconds.

When one or more of the foregoing three cases are met, the other inverter stations with priorities higher than the priority of the present inverter station in the present group send enabling signals.

After the foregoing solution is used, the present invention has the following beneficial effects:

(1) When an island includes multiple flexible direct-current inverter stations, the multiple flexible direct-current inverter stations may be prevented from synchronously entering a passive control mode.

(2) When multiple islands are formed because a fault occurs on an alternating-current transmission line in an island again, flexible direct-current inverter stations in the newly formed islands may enter a passive control mode.

BRIEF DESCRIPTION OF THE DRAWINGS

In FIG. 1, 01 refers to an alternating-current line 1, 02 refers to an alternating-current line 2, 03 refers to a user load 1, 04 refers to a user load 2, 05 refers to an alternating-current system, 06 refers to an inverter station 0, 07 refers to an inverter station 1, 08 refers to an inverter station 2, 09 refers to a direct-current transmission line, 10 refers to a flexible direct-current transmission system, 11 refers to an island 1, 12 refers to an island 2, and 13 refers to an island 3.

In FIG. 2, ISO_STATE indicates that the present inverter station detects a island state, S1 to Sn refer to other inverter stations that are in a same group with the present inverter station and that have priorities higher than the priority of the present inverter station, TCOM_NOK_Sx (x=1. . . n) indicates that there is no inter-station communication between the present inverter station and the other inverter stations that are in a same group with the present inverter station and that have priorities higher than the priority of the present inverter station, PAS_MODE_Sx (x=1. . . n) indicates that other inverter stations that are in a same group with the present inverter station and that have priorities higher than the priority of the present inverter station are in a passive control mode, and TO_PAS_MODE refers to an instruction for the present inverter station to enter a passive control mode.

DETAILED DESCRIPTION

The technical solutions are described below in detail with reference to the accompany drawings and specific embodiments.

The present invention provides a method for inhibiting multiple inverter stations from entering a passive control mode in an island state. Inverter stations are grouped into groups in advance. A grouping principle is grouping inverter stations whose alternating-current sides are connected to each other through an alternating-current line in a normal running condition into one group. A priority of each inverter station is set in advance in each group to set a relevant fixed value of each inverter station for island detection. A setting principle is that an inverter station with a higher priority has a more sensitive relevant fixed value, and correspondingly, the inverter station detects an island state more easily.

An inverter station that detects an island state can enter a passive control mode only when all other inverter stations with priorities higher than the priority of the present inverter station in the present group send enabling signals. That all other inverter stations with priorities higher than the priority of the present inverter station in the present group send enabling signals includes the following cases:

(1) there is no inter-station communication between the present inverter station and the other inverter stations with priorities higher than the priority of the present inverter station in the present group;

(2) there is inter-station communication between the present inverter station and the other inverter stations with priorities higher than the priority of the present inverter station in the present group, and the other inverter stations with priorities higher than the priority of the present inverter station in the present group are not in the passive control mode; and (3) there is inter-station communication between the present inverter station and the other inverter stations with priorities higher than the priority of the present inverter station in the present group, and the other inverter stations with priorities higher than the priority of the present inverter station in the present group enter the passive control mode and delay for a time of t, where 0<t<10 seconds.

Figure 2:
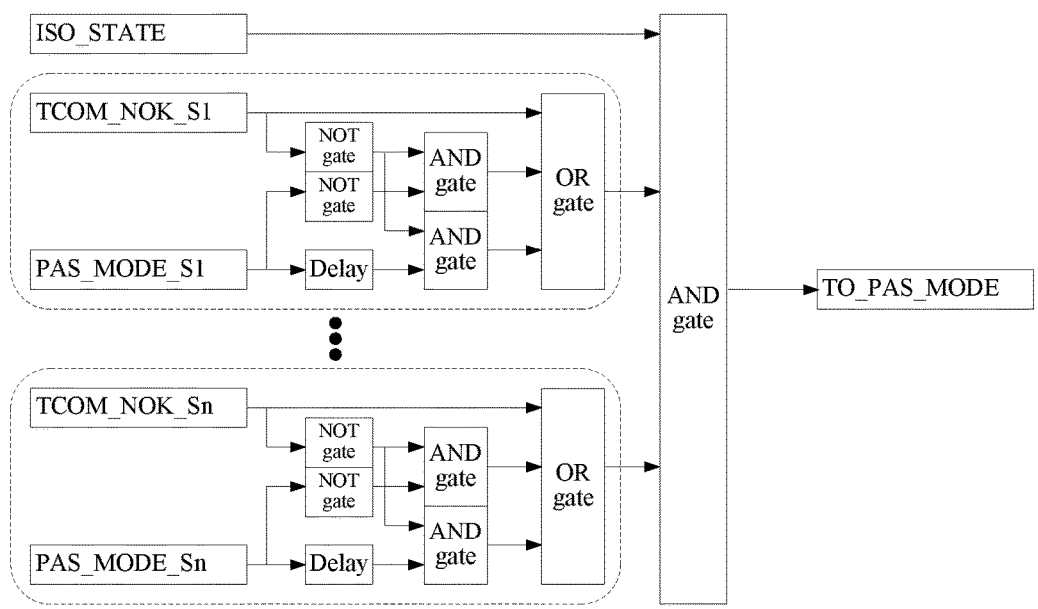
FIG. 2 is a schematic logic diagram of inhibiting multiple inverter stations from entering a passive control mode in an island state.

When one or more of the foregoing three cases are met, the other inverter stations with priorities higher than the priority of the present inverter station in the present group send enabling signals, as shown in FIG. 2.

Figure 1:
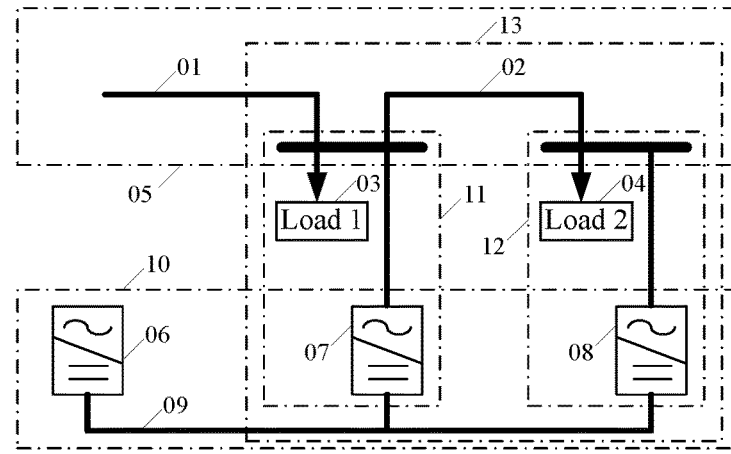
FIG. 1 is a typical system topology of a flexible direct-current transmission system.

FIG. 1 is a typical system topology of a flexible direct-current transmission system. In a normal case, a 05-alternating-current system and a 10-flexible direct-current transmission system supply power together to a 03-user load 1 and a 04-user load 2. A 06-inverter station 0, a 07-inverter station 1, and a 08-inverter station 2 are connected to each other through an alternating-current line, are grouped into a same group, and are all in a an active control mode.

The 06-inverter station 0 is a direct-current voltage control station and implements a power balancing function. The 07-inverter station 1 and the 08-inverter station 2 are power control stations and supply power to the 03-user load 1 and the 04-user load 2. A sequence of priorities of three inverter stations is set in descending order: the 06-inverter station 0, the 07-inverter station 1, and the 08-inverter station 2.

When there is no inter-station communication among the inverter stations, if a 01-alternating-current line 1 is faulty and is disconnected by a relay protection device, a 13-island 3 is formed, and the 06-inverter station 0 cannot detect an island state. Because a preset priority of the 07-inverter station 1 is higher than that of the 08-inverter station 2, the 07-inverter station 1 first detects an island state, enters a passive control mode, and maintains a magnitude and a frequency of an alternating-current voltage at rated values. In this case, the 08-inverter station 2 cannot detect an island state and continues maintaining an active control mode. If after the 01-alternating-current line has been disconnected for a period of time, the 02-alternating-current line 2 is also faulty and is disconnected by the relay protection device, the 13-island 3 is divided into two islands, namely, an 11-island 1 and a 12-island 2. The 08-inverter station 2 detects an island state, enters a passive control mode, and continues supplying power to the 04-user load 2.

When there is inter-communication among the inverter stations, if a 01 alternating-current line 1 is faulty and is disconnected by a relay protection device, a 13-island 3 is formed, and the 06-inverter station 0 cannot detect an island state and is still in an active control mode. The 07-inverter station 1 detects an island state and learns, by means of inter-communication, that the 06-inverter station 0 is in the active control mode. The 07-inverter station 1 instantly enters a passive control mode and maintains a magnitude and a frequency of an alternating-current voltage at rated values. In this case, the 08-inverter station 2 cannot detect an island state and learns, by means of inter-communication, that the 07-inverter station 1 is in the passive control mode. The 08-inverter station 2 continues maintaining an active control mode. If after the 01-alternating-current line 1 has been disconnected for a period of time, the 02-alternating-current line 2 is also faulty and is disconnected by the relay protection device, the 13-island 3 is divided into two islands, namely, an 11-island 1 and a 12-island 2. The 08-inverter station 2 detects an island state and learns, by means of inter-communication, that the 07-inverter station 1 has entered the passive control mode and lasts the passive control mode for a period of time t. The 08-inverter station 2 enters the passive control mode and continues supplying power to the 04-user load 2.

The foregoing embodiments are merely used to describe technical ideas of the present invention instead of limiting the protection scope of the present invention. All the technical ideas proposed according to the present invention and any modifications made based on the technical solutions all fall into the protection scope of the present invention.

What is claimed is:

1. A method for inhibiting multiple inverter stations from entering a passive control mode in an island state, comprising grouping inverter stations in a multi-terminal flexible direct-current transmission system into groups in advance, setting a priority of each inverter station for island detection in advance in each group, and setting a relevant fixed value of each inverter station for island detection according to the priority, wherein when detecting an island state, an inverter station enters a passive control mode only when all other inverter stations with priorities higher than the priority of the present inverter station in the present group send enabling signals.

2. The method for inhibiting multiple inverter stations from entering a passive control mode in an island state according to claim 1, wherein a principle for grouping the inverter stations into groups is grouping inverter stations whose alternating-current sides are connected to each other through an alternating-current line in a normal running condition into one group.

3. The method for inhibiting multiple inverter stations from entering a passive control mode in an island state according to claim 1, wherein a principle for setting the relevant fixed value of the inverter station for island detection is that an inverter station with a higher priority has a more sensitive relevant fixed value, and correspondingly, the inverter station detects an island state faster.

4. The method for inhibiting multiple inverter stations from entering a passive control mode in an island state according to claim 1, wherein that all other inverter stations with priorities higher than the priority of the present inverter station in the present group send enabling signals comprises the following cases:

(1) there is no inter-station communication between the present inverter station and the other inverter stations with priorities higher than the priority of the present inverter station in the present group;

(2) there is inter-station communication between the present inverter station and the other inverter stations with priorities higher than the priority of the present inverter station in the present group, and the other inverter stations with priorities higher than the priority of the present inverter station in the present group are not in the passive control mode; and (3) there is inter-station communication between the present inverter station and the other inverter stations with priorities higher than the priority of the present inverter station in the present group, and the other inverter stations with priorities higher than the priority of the present inverter station in the present group enter the passive control mode and delay for a time of t, wherein $0<t<10$ seconds.

* * * * *